Sept. 27, 1932.   B. ERICKSON   1,879,145
BAND SAW
Filed Jan. 9, 1931   2 Sheets-Sheet 1
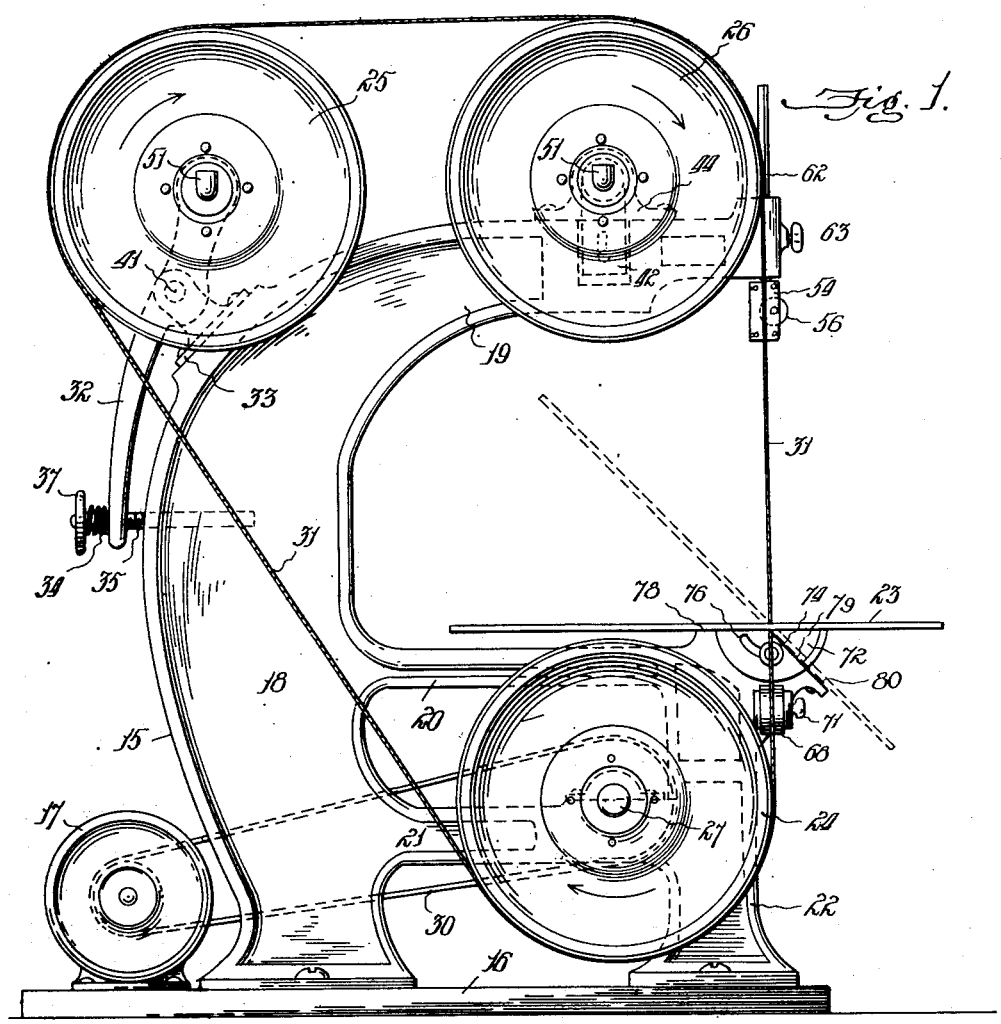
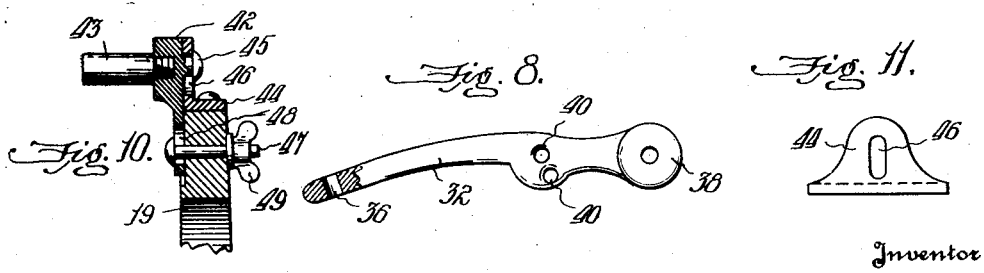
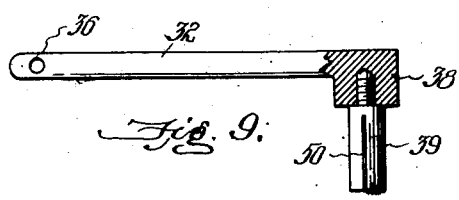
Inventor:-
B. Erickson.
By John V. Thomas & Co.
Attorneys.

Sept. 27, 1932. B. ERICKSON 1,879,145
BAND SAW
Filed Jan. 9, 1931 2 Sheets-Sheet 2
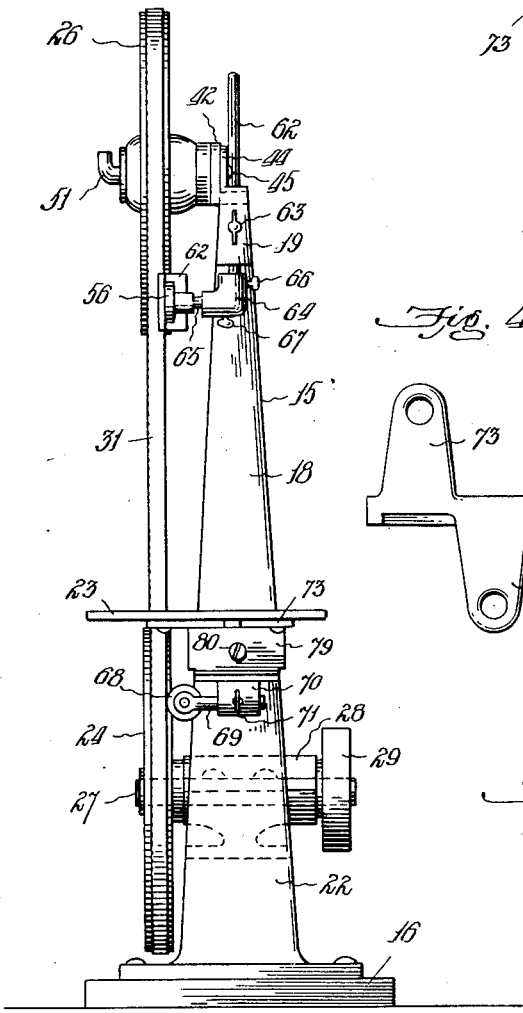
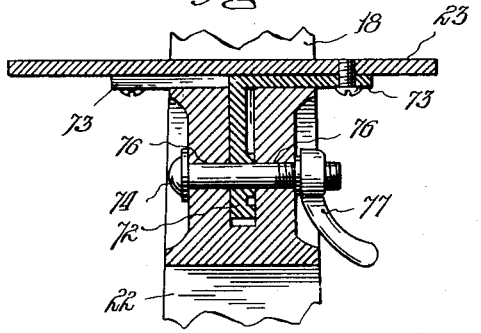
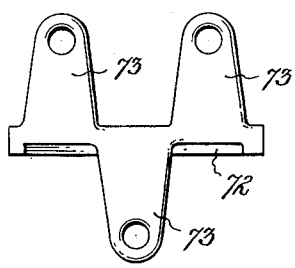
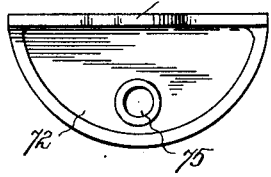
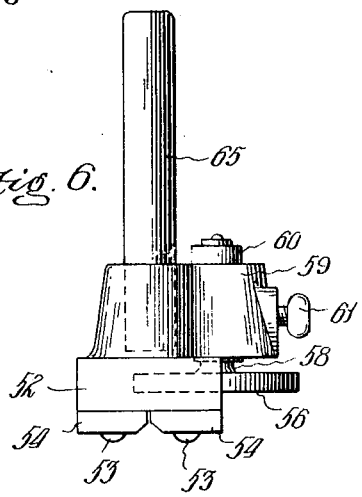

Patented Sept. 27, 1932

1,879,145

UNITED STATES PATENT OFFICE

BERNARD ERICKSON, OF DUNEDIN, FLORIDA, ASSIGNOR OF ONE-HALF TO OSCAR A. ERICKSON, OF CLEARWATER, FLORIDA

BAND SAW

Application filed January 9, 1931. Serial No. 507,675.

My invention is an improvement in sawing machines, and relates more especially to that special type in which the saw is in the form of an endless band passing over guiding wheels, including a motor-driven wheel, and through an opening in an adjustable work-table, with means for relieving strain on the saw in starting and stopping the same as well as during the operation of sawing.

The principal object of my invention is to provide a sawing machine of this general type in which the band-saw is operated by three guiding wheels arranged in substantially triangular formation with respect to each other with the motor driven guiding wheel mounted below the other two wheels one of which latter is carried by a lever under spring tension to not only maintain the band-saw taut but also absorb shock in the operation of the same, in combination with means for vertically adjusting the companion guiding wheel which cooperates with the wheel carried by the tension lever to accommodate bandsaws of different lengths, as for instance should the saw be shortened in repairing the same.

A further object of my invention is to provide an adjustable saw-guide by which the vertical stretch of the band-saw which passes on through the work-table will be firmly and securely guided in its work to overcome back thrust and lateral play.

My invention also contemplates the provision of means for adjusting the work-table on the supporting frame of the sawing machine, whereby said table can be firmly held in either horizontal position or at an angle according to the work to be performed by the machine.

Other objects and advantages of my improved sawing machine will be obvious from the accompanying drawings in connection with the following description of its construction and operation, and what I specifically claim as new and desire to protect by Letters Patent is set forth in the appended claim.

In the drawings:

Figure 1 is a side elevation of a sawing machine constructed in accordance with my invention.

Fig. 2 is a front elevation thereof.

Fig. 3 is a detail sectional view through the means for supporting and adjusting the work-table.

Figs. 4 and 5 are detail views of the segment-plate attached to the work-table.

Fig. 6 is a detail view in elevation of the upper saw guide.

Fig. 7 is a front view thereof.

Fig. 8 is a detail view of the lever which carries one of the guiding wheels for the band-saw.

Fig. 9 is an edge view of the lever, the end to which the wheel-bearing is attached being in section.

Fig. 10 is a sectional view of the adjustable bearing for one of the guiding wheels; and Fig. 11 is a detail view of the supporting bracket for the adjustable bearing.

The mechanism constituting my improved sawing machine is supported by a frame 15 mounted upon a bed plate 16 to which it is bolted, and upon this bed plate in the rear of the frame is mounted an electric-motor 17 for driving one of the wheels over which the band-saw passes. The supporting frame is of a particular shape for the proper disposition of the wheels operating and guiding the band-saw and which are located at one side of the frame as shown in Fig. 1, and to support these wheels, and the other parts of the machine, the body portion or main standard 18 of said supporting frame is curved forwardly at its upper end to provide an arm 19, and at its lower end is connected by spaced apart brace members 20, 21, to a short standard 22 upon the upper end of which latter the work-table 23 is mounted in the manner hereinafter described. As will be noted the forwardly projecting arm forming the upper part of the supporting frame is spaced from the upper end of the short standard 22 and connecting brace member 20 to provide a space for receiving the work and permitting the work-table to be tilted at an angle as indicated in dotted lines, Fig. 1, and it will also be noted that the shape of the supporting frame is such as to provide for arrangement of the band-saw wheels in triangular formation with the driving wheel 24 at the lower end of the frame and the guiding wheels 25 and 26 at the upper end thereof.

The driving wheel 24 is fixed to a shaft 27 journaled in a bearing 28 supported by the brace member 21, said shaft projecting beyond the opposite side of the supporting frame from the driving wheel to receive a pulley 29 connected to the electric-motor by belt 30, and the band-saw 31 passes from the driving wheel 24 over the guiding wheels 25 and 26 at the upper end of the frame with the guiding wheel 26 in vertical alignment with said driving wheel so that the saw as it passes from one to the other through the work-table will be perpendicular.

For the purpose of exerting tension on the saw to absorb shocks in the operation of the same the guiding wheel 25 is mounted on the upper end of a lever 32 fulcrumed in a bracket 33 bolted on the upper part of the main standard 18 of the supporting frame with the lower end of said lever engaged by a spring 34 exerting pressure thereon in the direction tending to move the guiding wheel carried by the lever away from the other wheels over which the band-saw passes to thereby tighten the band-saw while permitting it to yield and absorb shocks in the starting and stopping of the machine as well as during the operation of the same in sawing. This spring tension device consists of an adjusting screw 35 passing through an aperture 36 in the lower end of the lever and threaded into the standard 18 of the supporting frame with the helical spring 34 interposed between the end of the lever and a hand-wheel 37 at the outer end of the screw, whereby the tension of the spring as applied to the lever may be regulated and the normal position of guiding wheel 25 varied with respect to the other band-saw wheels in adjusting the saw on the machine. As shown in Figs. 8 and 9 the upper end of the spring-actuated tension lever is provided with a boss 38 into which is threaded the spindle 39 on which the guiding wheel 25 is journaled, and in order to provide for further adjustment of this wheel spaced apart holes 40 are formed in the lever through either one of which the fulcrum-pin 41 of the bracket 33 may be passed. As will be seen the spring 34 exerts a pressure on the lower end of the lever to move the guiding wheel 25 so as to take up slack in the band-saw and at the same time will permit of a certain amount of yield or resiliency of the band-saw under spring tension which may be varied by adjusting the screw 35.

To provide for further adjustment of the guiding wheels with respect to the length of the band-saw the wheel 26 is adjustable vertically on the arm 19 of the supporting frame for which purpose a bearing member 42 for said wheel, carrying spindle 43, is connected at its upper end to a supporting bracket 44 by means of a headed lug 45 passing through slot 46 in said bracket and at its lower end said bearing member is connected to the arm by means of a bolt 47 passing through a slot 48 in the bearing member and through a transverse hole in the supporting arm with a winged nut 49 threaded on the outer end of the bolt, as shown in Fig. 10. The guiding wheel 26 and guiding wheel 25 turn freely on the spindles 43 and 39 respectively, and in order to lubricate the bearings said spindles are provided with oil grooves 50 (Fig. 9) into which the oil is fed from a cup 51.

The wheels guiding and operating the band-saw turn in the direction indicated by the arrows in Fig. 1 and consequently the band-saw in its operation on the work supported by the table 23 passes from guiding wheel 26 to the driving wheel 24, and for the purpose of effectively guiding the saw to its work I provide a particular form of saw-guide more clearly illustrated in Figs. 6 and 7 and consisting of a block 52 to the face of which is fastened by screws 53 steel plates or jaws 54, 54, between which the band-saw passes to prevent lateral play, and to prevent back thrust the rear edge of the saw engages a wheel or disk 56 turning in a recess 57 in the block, it being noted that the saw engages the wheel or disk at one side of its axis and adjustment of the jaws is provided by slots 55 through which the screws 53 pass. The spindle 58 of this wheel is journaled in an offset portion 59 of the block and is provided with a bushing 60 engaged by a thumb screw 61 for holding the wheel in place. The saw-guide is supported by an adjustable fixture at the forward end of the arm 19 of the supporting frame consisting of a rod 62 passing vertically through the arm and secured thereto by a set-screw 63 with an elbow-coupling 64 at the lower end of the rod into which is received a rod 65 extending from the block of the saw-guide, the said vertical rod 62 entering one member of the coupling and secured thereto by set screw 66 and rod 65 of the saw-guide entering the other member of said coupling to which it is secured by set-screw 67, whereby vertical adjustment of the saw-guide is had by adjusting the vertical rod in the outer end of the supporting arm 19 while lateral adjustment is effected by the rod 65 and set screw 67. This device guides the saw on its approaching the work, and as a further protection against back thrust a roller 68 is located below the work-table to bear against the rear edge of the saw, said roller being carried between the forked end of a rod 69 horizontally mounted in a bar 70 near the upper end of the standard 22 of the supporting frame of the machine and adjustably secured thereto by means of a set screw 71.

The work-table 23 is pivoted to the upper end of the front standard 22 by means of a segment plate 72 attached to the underside of the table by oppositely projecting ears 73, the segment-plate depending into a recess in the standard to receive a clamping bolt 74 passing through a hole 75 in the segment plate and through slots 76 in the standard, whereby the tightening of the handled nut 77 will clamp said segment plate in any position to which it may be tilted, the upper part of the standard being provided at its rear end with a horizontal surface 78 on which the table rests in horizontal position and at its forward end with an inclined surface 79 having a set screw 80 for limiting the extent to which the table may be tilted.

The surfaces of the driving and guiding wheels 24, 25, and 26 may be and preferably are covered with any suitable material, as rubber, for gripping the saw as it passes over said wheels.

As will be understood from the foregoing description the band-saw extending around the three guiding wheels is placed under normal tension by adjustment of the wheel 26 and lever carrying the wheel 25 and is driven by the driving wheel 24 connected to the electric motor, the vertical stretch of the saw which operates on the work supported by the table 23 being guided in its operation by the upper and lower saw guides respectively, and the table adjusted according to the manner in which the material is to be sawed, any shock in starting and stopping the saw as well as during the operation of the same being absorbed by the wheel 25 which is under spring tension of the lever 32 carrying the same.

I claim:

In a sawing machine the combination with a supporting frame, of a driving wheel journaled in the lower part of the frame, spaced apart guiding wheels mounted in the upper part of the said frame on approximately the same horizontal plane, with the front wheel on a vertical line with the driving wheel, a band-saw passing over the driving and guiding wheels to be operated by said driving wheel, and spring-actuated means for moving the rear guiding wheel to exert tension thereon in a direction away from the other wheels to absorb shock on the band-saw in the operation thereof, comprising a bracket mounted on the supporting frame, a lever fulcrumed at an intermediate point on a pin supported by the bracket with a plurality of holes in the lever to receive the pin for adjusting said lever, the rear guiding wheel being mounted on the upper end of the lever, a headed adjusting screw extending loosely through a hole in the lower end of the lever and threaded into the supporting frame, and a spring interposed between the lever and head of the screw; together with a vertically adjustable bearing at the upper part of the frame in which the front guiding wheel is mounted, and means for adjusting said bearing with respect to the supporting frame and driving wheel over which the band saw passes.

BERNARD ERICKSON.